United States Patent
De Ayala et al.

(10) Patent No.: US 9,959,419 B2
(45) Date of Patent: May 1, 2018

(54) DIGITAL COMMUNICATIONS

(71) Applicant: OPTIMARK, LLC, San Juan, PR (US)

(72) Inventors: Oscar Moreno De Ayala, Rio Pietas, PR (US); Anatol Zygmunt Tirkel, East Brighton (AU)

(73) Assignee: Optimark, L.L.C., San Juan, PR (US)

( * ) Notice: Subject to any disclaimer, the term of this patent is extended or adjusted under 35 U.S.C. 154(b) by 555 days.

(21) Appl. No.: 14/357,341

(22) PCT Filed: Nov. 9, 2012

(86) PCT No.: PCT/AU2012/001377
§ 371 (c)(1),
(2) Date: May 9, 2014

(87) PCT Pub. No.: WO2013/067589
PCT Pub. Date: May 16, 2013

(65) Prior Publication Data
US 2015/0128290 A1 May 7, 2015
US 2017/0154187 A9 Jun. 1, 2017

(30) Foreign Application Priority Data

Nov. 11, 2011 (AU) ................................ 2011904698

(51) Int. Cl.
G06F 21/62 (2013.01)
G10L 19/018 (2013.01)
(Continued)

(52) U.S. Cl.
CPC ........ G06F 21/6209 (2013.01); G10L 19/018 (2013.01); H04N 5/76 (2013.01);
(Continued)

(58) Field of Classification Search
CPC .... G10L 19/018; H04N 9/8211; H04N 5/913; H04N 5/76; H04N 21/8358;
(Continued)

(56) References Cited

U.S. PATENT DOCUMENTS

2003/0009671 A1* 1/2003 Yacobi ................... G06T 1/005
713/176
2003/0031318 A1* 2/2003 Troyansky .............. G06T 1/005
380/202
(Continued)

FOREIGN PATENT DOCUMENTS

EP 0 766 468 B1 5/2006
JP 2006 227330 A 8/2006
WO WO 2011/050390 A1 5/2011

OTHER PUBLICATIONS

International Search Report and Written Opinion for Application No. PCT/AU2012/001377 dated Feb. 19, 2013.
(Continued)

Primary Examiner — Darren B Schwartz
(74) Attorney, Agent, or Firm — Alston & Bird LLP

(57) ABSTRACT

A device to apply a digital fingerprint to a digital signal comprises a means of intercepting or acquiring a signal, a storage element and a processor for executing computer implemented program code components in the storage element to effect the methods. The methods include transforming a plurality of signal samples onto a discrete orthonormal basis and ranking the transformed samples according to their magnitude. The n largest principal components of the ranked transformed samples are optionally permuted to generate a re-ordered set of principal components, which are then altered by a marking angle. The marked principal components and unmarked non-principal components are converted and combined and applying an inverse of the transform function to the combined principal and non-principal
(Continued)

components to generate a fingerprinted digital signal. Methods to prepare the signal for marking, recover the digital fingerprint and verify the distributor and/or recipients of the signal are also disclosed.

11 Claims, 9 Drawing Sheets

(51) Int. Cl.
      *H04N 9/82* (2006.01)
      *H04N 5/913* (2006.01)
      *H04N 5/76* (2006.01)
      *H04N 21/8358* (2011.01)

(52) U.S. Cl.
      CPC ........... *H04N 5/913* (2013.01); *H04N 9/8211* (2013.01); *H04N 21/8358* (2013.01); *H04N 2005/91335* (2013.01)

(58) Field of Classification Search
      CPC ..... G06T 2201/0051; G06T 2201/0052; G06T 2201/0061; G06T 2201/0063; G06T 2201/0065; G06T 2201/0833; G06T 1/0085
      See application file for complete search history.

(56) References Cited

U.S. PATENT DOCUMENTS

| | | | | |
|---|---|---|---|---|
| 2003/0103679 | A1* | 6/2003 | Etoh | H04N 19/176 382/250 |
| 2003/0112974 | A1* | 6/2003 | Levy | G06T 1/0071 380/210 |
| 2003/0202660 | A1* | 10/2003 | Zhou | H04N 21/8358 380/210 |
| 2004/0101048 | A1* | 5/2004 | Paris | G10L 19/04 375/240.12 |
| 2012/0213402 | A1* | 8/2012 | Moreno De Ayala | G06T 1/0071 382/100 |

OTHER PUBLICATIONS

International Preliminary Report on Patentability for Application No. PCT/AU2012/001377 dated Oct. 31, 2013.
Supplementary European Search Report for Application No. EP 12 84 7715 dated Jul. 8, 2015.
Kirovski, D. et al., *Spread-Spectrum Watermarking of Audio Signals*, Transactions on Signal Processing, vol. 51, No. 4 (Apr. 2003) 1020-1033.
Yaslan, Y. et al., *An Integrated Decoding Framework for Audio Watermark Extraction*, Proceedings of the 17$^{th}$ International Conference on Pattern Recognition (Jan. 1, 2004) 4 pages.
He, X. et al., *A High Capacity Watermarking Technique for Stereo Audio*, Acoustics, Speech, and Signal Processing, vol. 5 (May 17, 2004) pp. 393-396.
Modegi, T., *Construction of Ubiquitous Acoustics Spaces Using Audio Watermark Technology and Mobile Terminals*, IEEJ Transactions on Electrical and Electronic Engineering, vol. 2, No. 6 (Nov. 1, 2007) 608-619.
Kirovski, D. et al., *Collusion of Fingerprints via the Gradient Attack*, ISIT 2280-2284 (2005) 5 pages.

* cited by examiner (a)

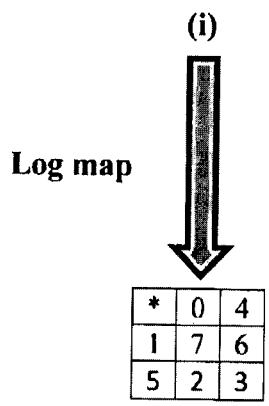
Log map
(i)
(ii)
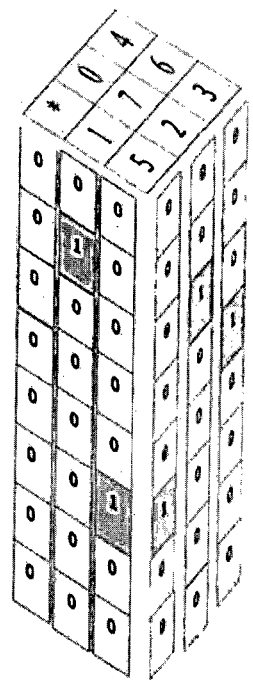
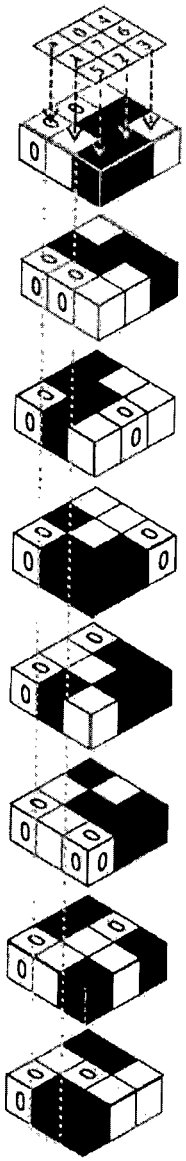
FIG 10A　　　FIG 10B　　　FIG 10C

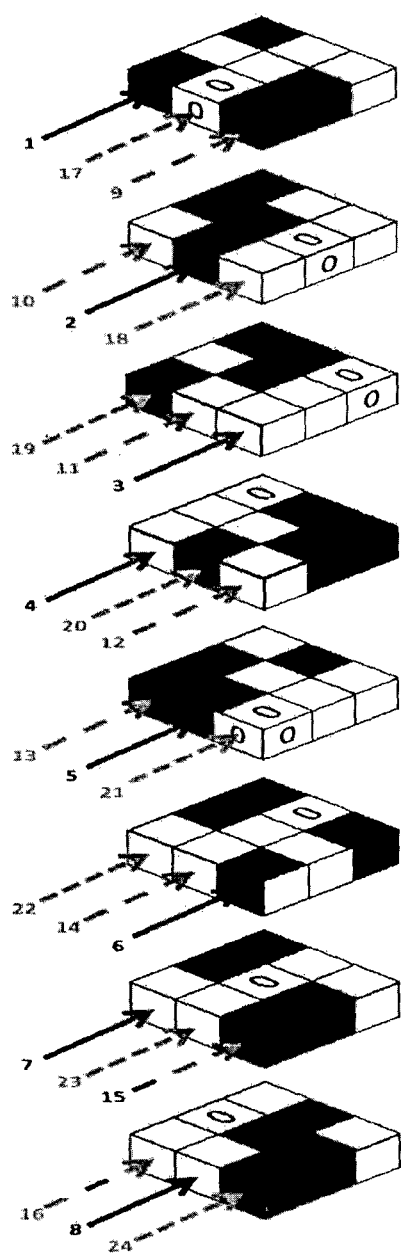
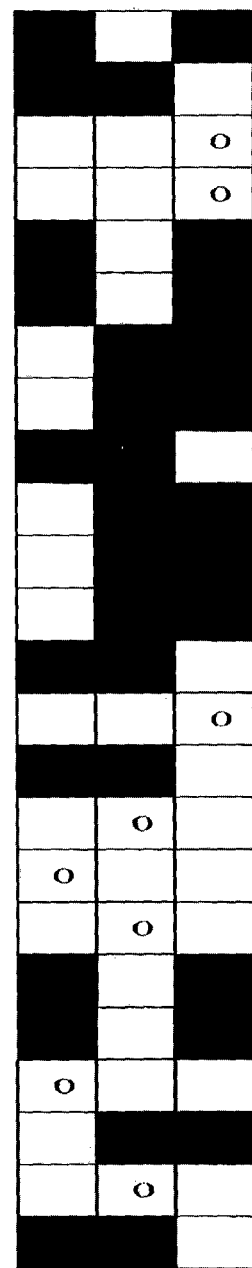
FIG 12A
FIG 12B

DIGITAL COMMUNICATIONS

CROSS-REFERENCE TO RELATED APPLICATIONS

This application is the U.S. National Stage of International Application PCT/AU 2012/001377 filed Nov. 9, 2012, which designates the U.S. and was published by the International Bureau in English on May 16, 2013, and which claims the benefit of Australian Application No. 2011904698, filed Nov. 11, 2011, both of which are hereby incorporated by reference in their entirety.

FIELD OF THE INVENTION

The present invention relates to digital communications. In particular, the present invention relates to methods and apparatus for marking digital signals, such as audio, video and multi-media signals with digital fingerprints. The present invention also relates to preparing digital signals for marking, recovering digital fingerprints from signals and verifying distributors and recipients of signals marked with digital fingerprints.

BACKGROUND OF THE INVENTION

Digital fingerprinting is a technique for tracing the distribution of multimedia content and protecting it from unauthorized manipulation. Unique identification information is embedded into each distributed copy of the signal. In a collusion attack, signals are combined to remove or distort the fingerprints. Audio signals are good candidates for fingerprinting, because of the forgiving nature of the human auditory system to cross-talk between channels.

A broad definition of a digital watermark is any signal that is added to a document in order to embed some information. The original digital watermark, (Tirkel A. Z., Rankin G. A., van Schyndel R. M., Ho W. J., Mee N. R. A., and Osborne C. F. 1993. Electronic Water Mark, DICTA 93, Macquarie University, p. 666-673), contained information about the owner of the document, or about the document itself. Since then, watermarks have been embedded and recovered from still images, video, audio and many other information carrying formats. Research into watermarking and the related field of information hiding (steganography) has been prolific, with the nature and application of watermarks diversifying dramatically. One important application is digital fingerprinting (Boneh D., Shaw J. 1998. Collusion-secure fingerprinting for digital data, IEEE Trans. on Information Theory, 44 (5), 1897-1905.), where the specific objective of the watermark is to identify a recipient of a document. This ability to trace the document from its originator results in an audit trail. One reason for the proliferation of watermarks/fingerprints is that the fingerprint should be matched to the nature of the document and the response characteristic of the recipient.

There are many different types of documents and many ways of processing and interpreting them, including compression, cropping and innocent or deliberate distortions. Also, as watermarking has gained acceptance, countermeasures have developed., Resistance to processing distortions and countermeasures has been a major focus of research into this area.

A fundamental difference between still image and audio watermarking is that an image is presented in parallel fashion—all pixels are available to the eye—whilst audio is presented serially to the ears. A digital audio fingerprint must be unobtrusive so that it does not distract the listener from the audio content and it is difficult for a potential attacker to detect in the electronic version. Kirovski D. 2005. Collusion of Fingerprints via the Gradient Attack, ISIT, 2280-2284 describes key requirements of fingerprints and the consequences of collusion attacks: "Imperceptiveness, robustness, and reliability are the key requirements for fingerprints. One major difference with respect to content screening is that the robustness requirement is significantly easier to satisfy—fingerprint detection is done in the presence of the original clip, not "blindly".

A major problem for fingerprinting systems is known as a collusion attack. To launch such an attack, an adversarial clique of malicious users colludes their copies in order to create a copy which is statistically clean of any fingerprint traces (e.g., the original) or a copy that incriminates another innocent user. Collusion resistance for multimedia content is typically low. This deficiency restricts fingerprinting systems to small distribution lists. One of the most devastating problems for fingerprinting systems is surprisingly, successful identity theft. An adversary with a stolen identity can purchase a multimedia clip and then illegally distribute it, leaving multimedia studios without a target for legal action.

Collusion is usually the most effective effort to defeat fingerprinting schemes as opposed to other signal processing attacks that target removal or obfuscation of the embedded secret information. For example, while an estimation attack typically produces a pirated copy of inferior quality, the result of collusion is of equal or even better quality than the distributed content.

The adversary can typically have two types of goals: (i) removal of their fingerprints from the pirated copy and (ii) framing an innocent user. The latter attack is of particular importance because it governs the number of copies the copyright owner can distribute. Once innocent users can be, framed, the entire system is rendered dysfunctional.

Digital watermarks/fingerprints traditionally rely on patterns produced by random number generators based on digital techniques or physical processes. Whilst this is a simple process, one fundamental drawback is that the probability of two or more patterns being identical or almost identical is not zero. This shortcoming means that watermarks based on such patterns cannot be admissible as evidence beyond reasonable doubt and multiple patterns cannot be embedded in one file because of potential mutual interference. The latter restricts the information capacity of watermarks based on such patterns and precludes them from being used for fingerprinting and audit trails. Also, it renders a watermark based on such patterns vulnerable to collusion attack.

The reference to any prior art in this specification is not, and should not be taken as, an acknowledgement or any form of suggestion that the prior art forms part of the common general knowledge.

OBJECT OF THE INVENTION

It is a preferred object of the present invention to provide a system and/or method and/or apparatus that addresses or at least ameliorates one or more of the aforementioned problems or provides a useful alternative.

SUMMARY OF THE INVENTION

Generally, the present invention relates to methods and apparatus for preparing digital signals for marking and marking such prepared signals with a digital fingerprint, verifying a distributor and/or one or more recipients of marked digital signals and recovering and removing a mark from marked digital signals.

According to one aspect, but not necessarily the broadest aspect; the present invention resides in a method of preparing a digital signal for marking including:

transforming a plurality of samples of the signal onto a discrete orthonormal basis;

ranking the transformed samples according to their magnitude; and selecting, the n largest principal components of the ranked transformed samples of the signal to produce a digital signal ready for marking.

The method may include permuting a set of the n largest principal components to generate a re-ordered set of principal components of the samples.

Suitably, transforming the samples includes applying one of the following to the samples of the signal: a discrete Fourier transform; a discrete wavelet transform; a fractal function.

Preferably, the plurality of samples includes a prime number of samples.

Suitably, the method can include down-sampling the signal, for example by a factor of at least 10.

Suitably, the transformed samples can be ranked according to their frequency where transformed samples comprise an equal magnitude.

Preferably, n≥the number of recipients of the digital signal.

Suitably, the signal is an audio signal, such as a monophonic or multichannel signal, a video signal or a multimedia signal.

According to another aspect, although not necessarily the broadest aspect, the present invention resides in a method of marking a digital signal with a digital fingerprint including:

transforming a plurality of samples of the signal onto a discrete orthonormal basis;

ranking the transformed samples according to their magnitude;

altering the n-largest principal components of the ranked transformed samples by a marking angle to generate marked principal components;

converting the marked principal components and unmarked non-principal components into Cartesian coordinates;

combining the converted, marked principal components with the converted un-marked, non-principal components of the signal; and applying an inverse of the transform function to the combined principal and non-principal components to generate a fingerprinted digital signal.

The method may include permuting the set of the n-largest principal components of ranked samples to generate a re-ordered set of principal components.

Suitably, the signal is an audio signal, such as a monophonic or multichannel signal, a video signal or a multimedia signal.

Preferably, the marking angle applied is a function of a respective principal component, a time interval of the digital signal comprising the principal components and one or more intended recipients of the digital signal.

Suitably, the marking angle is the arctangent of the ratio of two components of the digital signal, such as stereo components of a digital audio signal. Alternatively, two such components can be obtained by arbitrary partitioning of the signal into two data streams.

Preferably, the method includes scaling the re-ordered set of principal components prior to altering with the marking angle to render changes in the resulting marked digital signal imperceptible to a listener.

Preferably, the method includes applying a synchronisation watermark in the digital signal using a noise array that is pseudo-random in the time domain or in the time and frequency domain.

Suitably, the synchronisation watermark can conceal additional data relating to the originator of the digital signal.

Suitably, the data is concealed in a pattern of polarity reversals of the pseud-random noise array.

According to a further aspect, although not necessarily the broadest aspect, the present invention resides in a method of verifying a distributor and/or one or more recipients of a digital signal marked with a digital fingerprint and synchronisation watermark, the method including:

transforming the marked signal using the same transform function used for marking the signal;

determining a peak in a cross-correlation of a template with a pseudo-random noise array used in applying the synchronisation watermark;

correcting frequency and synchronisation errors in the marked signal; and decoding fingerprint data from a pattern based on the pseudo-random noise array, wherein correct data yielded from the decoding step verifies the distributor and/or recipient of the signal.

Preferably, correcting frequency and synchronisation errors in the marked signal is on the basis of a location of the peak in the cross-correlation.

According to yet another aspect, although not necessarily the broadest aspect, the present invention resides in a method of recovering a digital fingerprint from a marked digital signal, the method including:

correcting frequency and synchronisation errors in samples of the marked signal;

transforming the corrected samples of the signal using the same transform function used for marking the signal with a digital fingerprint;

converting the corrected, transformed samples of the signal and samples of a reference signal to polar coordinates;

ranking the converted samples and converted reference samples according to their magnitude;

selecting the n largest principal components of the ranked samples and the ranked reference samples;

performing a cross-correlation of the ranked samples with reference arrays identifying the intended recipients of the digital signal;

identifying digital fingerprints from correlations above a predetermined threshold; and subtracting polar angles in the digital fingerprints from polar angles in the signal samples to remove the digital fingerprint from the digital signal.

The method may include permuting a set of the n largest principal components of the samples and the reference samples to recover the original ordering.

According to a yet further aspect, although not necessarily the broadest aspect, the present invention resides in a device for applying a digital fingerprint to a digital signal, the device comprising:

a receiver for receiving the signal;

a storage element storing computer implemented programme code components for processing the signal; and a processor coupled to be in communication with the receiver and the storage element for executing at least some of the computer implemented programme code components for:

transforming a plurality of samples of the signal onto a discrete orthonormal basis;

ranking the transformed samples according to their magnitude;

selecting the n-largest principal components of the ranked transformed samples;

altering the n-largest principal components of the ranked transformed samples by a marking angle to generate marked principal components;

converting the marked principal components and unmarked non-principle components into Cartesian coordinates;

combining the converted, marked principal components with the converted un-marked, non-principal components of the signal; and applying an inverse of the transform function to the combined principal and non-principal components to generate a fingerprinted digital signal.

Further aspects and/or features of the present invention will become apparent from the following detailed description.

BRIEF DESCRIPTION OF THE DRAWINGS

In order that the invention may be readily understood and put into practical effect, reference will now be made to preferred embodiments of the present invention with reference to the accompanying drawings, wherein like reference numbers refer to identical elements. The drawings are provided by way of example only, wherein:

FIGS. 10A-10C illustrate a logarithmic array used in embodiments of the present invention;

FIGS. 12A and 12B illustrate the use of Chinese Remainder Theorem in embodiments of the present invention.

Figure 1:
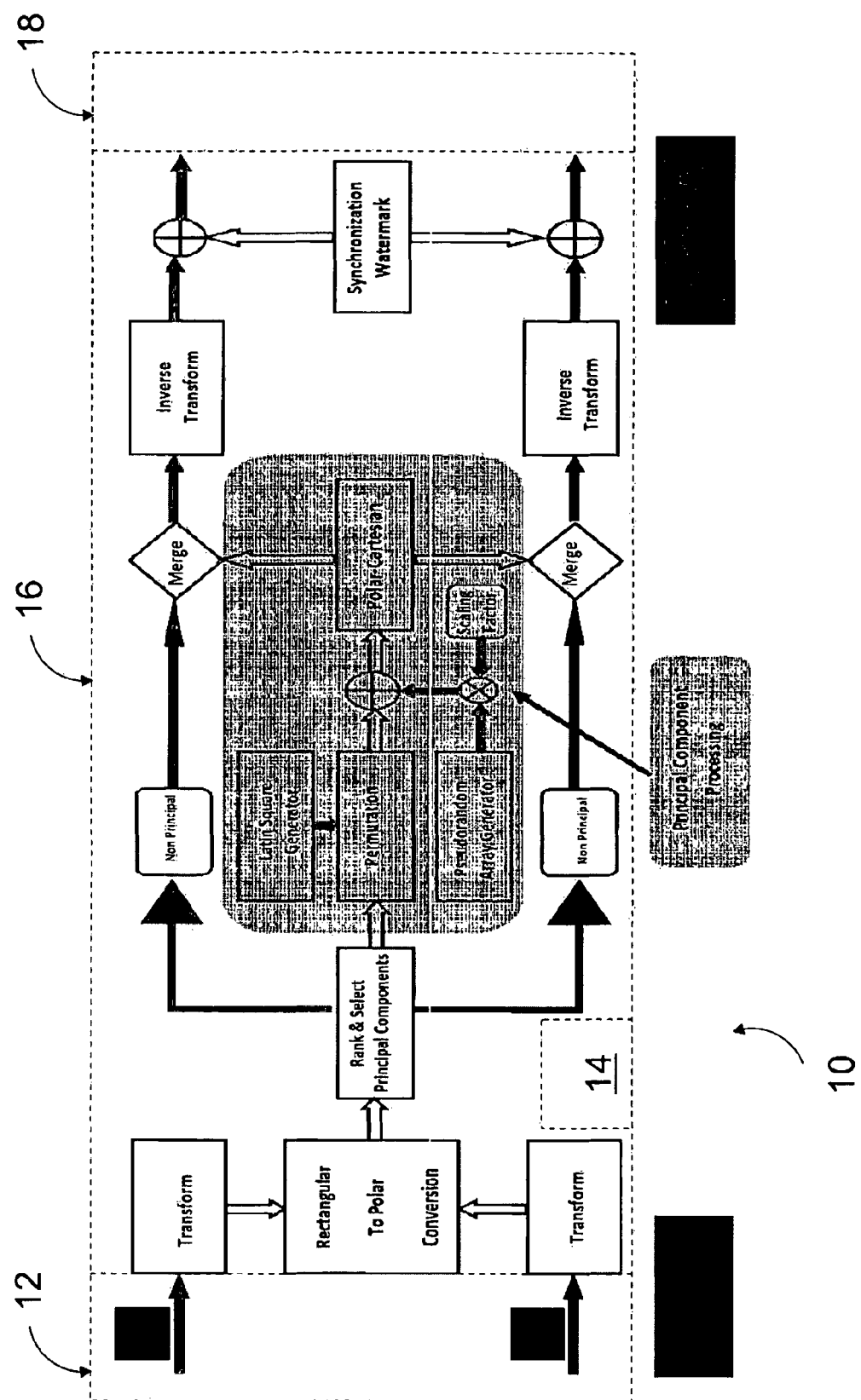
FIG. 1 is a schematic diagram illustrating a device and methods for processing and marking digital signals in accordance with embodiments of the present invention.

Skilled addressees will appreciate that elements in the drawings are illustrated for simplicity and clarity and have not necessarily been drawn to scale. For example, drawings may be schematic and the relative dimensions of some of the elements in the drawings may be distorted to help improve understanding of embodiments of the present invention.

DETAILED DESCRIPTION OF THE PREFERRED EMBODIMENTS

Embodiments of the present invention use principal components of digital signals to construct an abstract vector space. The digital fingerprints are ordered rotations in that space. The rotations are determined by arrays with good correlation properties. Where the signals are multichannel signals, multi-dimensional arrays can be employed. When arrays are embedded in, for example, real audio, they are imperceptible according to a panel of experts. The digital fingerprints are resistant to an averaging collusion attack by hundreds or thousands of colluders and can withstand a worst case RandNeg attack by at least 37 colluders.

The present invention makes use of algebraic techniques applied to Finite (Galois) Fields. Embodiments of the present invention are based on families of patterns with low off-peak auto-correlation and low cross-correlation. The probability of two or more patterns being identical or similar is negligible, even when the data is subjected to intentional or unintentional distortions or corrupted by noise. Embodiments of the present invention allow the use of more than one pattern in a file, so that the information capacity can be enhanced and/or so that recipients or entities who open or access a file can add their pattern to the file without compromising other patterns which are already there. Also, watermarks built using the patterns of the present invention are resistant to collusion and can be used to identify colluders because of the correlation properties of the patterns.

With reference to FIG. 1, embodiments of the present invention include a device 10 for processing digital signals comprising an input module in the form of a receiver 12 for receiving digital signals, such as audio signals, video signals and multi-media signals. Device 10 comprises a storage element 14, such as a computer memory, for storing computer implemented programme code components for processing the digital signals. Device 10 also comprises a processing module in the form of a processor 16 coupled to be in communication with the receiver 12 and the storage element 14 for executing at least some of the computer implemented programme code components to perform the methods described herein. Device 10 can also comprise an output module in the form of a transmitter 18 for transmitting the processed digital signals. It will be appreciated that in some embodiments receiver 12 and transmitter 18 can be embodied in a single transceiver.

With reference to FIG. 1, embodiments of the present invention include a method of preparing a digital signal for marking with a mark in the form of a digital fingerprint. This method can be applied to any digital signal, but this example considers an audio signal in the form of the popular IHD audio standard, which has at least two channels, each sampled at 96 or 192 KHz. Each channel is represented by a time series of integers, with each integer having 20-24 bit resolution. The channels represent signals controlling left and right speakers, and therefore what is intended to reach the left and right ear of the listener, respectively. Averaged over sufficient periods, the magnitudes (norms) of the signals S(i) for the left and right channel are approximately equal (balanced):

$$S(i)=[L(i),R(i)], i \in I, \text{ for time interval } I, \text{ and } \overline{L} \approx \overline{R} \quad (1)$$

The method of preparing a digital signal for marking includes transforming a plurality of samples of the audio signals in both channels by projecting them onto a discrete orthonormal basis. Examples of such bases are sines and cosines which are harmonically related (Fourier), wavelets and fractal functions. Audio signals range from 20 Hz to 20 KHz, with the majority of the information and hence energy content being concentrated between 300 Hz and 3 KHz. The sampling must be at least twice per period of the highest frequency (Nyquist) which is higher than required for the digital fingerprinting process. Hence, in preferred embodiments the method includes down-sampling the audio by a factor of at least 10, typically 10 or 20, before the spectral analysis.

Consider a time segment of, for example, 1021 samples of the audio signal. Methods of, the present invention preferably use a prime number of samples for cryptographic resistance, although other non-prime numbers of samples can be used. In this example, 1021 samples represent 100 ms of audio data. Transforming the plurality of samples of the audio signals can take place after applying appropriate windowing (such as Turkey). Performing, for example, a discrete Fourier transform (DFT) on the above samples:

$$S(f)=[L(f),R(f)]f=0,1 \ldots 1024. \quad (2)$$

Consider the left and right channels of the signal samples as components of a vector, with magnitude S and direction θ:

$$S(f) = \sqrt{[L(f)]^2 + [R(f)]^2}, \quad (3)$$
$$\theta = \frac{\tan^{-1}\square(L(f))}{R(f)}$$

The method includes ranking the transformed 1024 samples representing the 100 ms of the audio signal according to their magnitude and selecting the largest n principal components of the ranked transformed signals. The value of n must be at least as large as the number of recipients of the audio, any of whom can collude with each other. Should there be components with equal magnitude, the method includes ranking the components according to frequency.

Embodiments of the method can include checking that the n principal components for the time interval are all above some suitable threshold. For example, the magnitude of a component can be compared to the mean value of all components by taking a ratio of the two. If this ratio exceeds a suitable threshold, for example, 3, the principal component is statistically significant. This threshold is dependent on the content of the digital signal. The higher the ratio, the more separable the principal components become. This, in turn leads to greater robustness against unintentional distortions, such as dubbing, or re-mastering.

Embodiments of the method can include checking that the n principal components satisfy the following balance criterion: 35°<θ<55°, where the angles correspond to ±3 dB balance between left and right channels.) If a principal component with suitable magnitude does not meet the balance criterion, that principal component is skipped the next ranked principal component is checked.

If n suitable principal components cannot be found, that time interval is not marked. This is to prevent marking silent or quiet intervals in which the changes to the signal to mark the signal as described herein could be obtrusive, difficult to decode and/or involve the marking of highly unbalanced passages. There are about 10 intervals per second of audio, so the loss of a few marking opportunities is not a major issue. It should also be noted that the start of each analysis period (time interval) need not be regular. Random or pseudo-random gaps in the analysis periods may serve to confuse potential attackers and the pattern of gaps can act as a secret key.

For time intervals where suitable principal components are found, there are n components which are to be modified (marked). Denote the set of components, in descending order as:

$$\{S_j\} \text{ with}=0,1, \ldots ,n-1. \quad (4)$$

The method of preparing a digital signal for marking includes permuting the set of the n largest principal components to generate a re-ordered set of principal components of the samples of the audio signal ready for marking with the digital fingerprint. The permutation of the set can be performed according to a row of a Latin Square, or any other suitable permutation with cryptographic strength. The arrays used in preferred embodiments of the present invention are based on primes or prime powers and therefore the discrete logarithm is one such permutation in such embodiments. Basically j gets mapped to j' and the re-ordered set is:

$$\{S_{j'}\} \text{ with}=0,1, \ldots ,n-1. \quad (5)$$

Once samples of the audio signal have been prepared for marking as described above, according to another aspect, embodiments of the present invention include a method of marking the audio signal with a digital fingerprint. The method includes altering the re-ordered set of principal components by a marking angle $\varphi^M$ to generate marked principal components. Consider recipient k, the set $\{S_j\}$ will be marked by altering it to:

$$S_j^{*M} = \sqrt{[R(f_j)]^2 + [L(f_j)]^2}, \quad (6)$$
$$\theta^M = \frac{\tan^{-1}\square(L(f_{j'}))}{R(f_{j'})} + \phi^M \text{ for } j' = 0, 1, \cdots, n-1$$

The angles $\varphi^M$ are functions of the recipient k, the principal component j' and the time interval. Note, that the magnitude is not affected by the marking, and therefore neither is the ranking. There are many possible methods of controlling the marking angle $\varphi^M$ depending on the objectives of the digital fingerprinting scheme, such as imperceptibility, robustness to unintentional distortions, collusion resistance, or a combination of two or more of the above attributes.

For each recipient k, the value of $\varphi^M$ for n principal components over m time intervals can be determined by the values of entries in an array, as discussed hereinafter. Another feature of this method is that only the largest principal components of the audio are modified. This permits the largest modification to be performed, whilst taking advantage of the masking properties of the human auditory system (HAS). Details on the sensitivity of HAS to fluctuations in balance between signals received by the two ears are outlined hereinafter.

The method of marking the audio signal includes converting the marked, principal components and the unmarked, non-principal components into Cartesian coordinates. The converted, marked components can be represented as follows:

$$L^M=Z\cos(\theta+\varphi))=Z(\cos\theta\cos\varphi-\sin\theta\sin\varphi)). \quad (7a)$$

$$R^M=Z\sin(\theta+\varphi)=Z(\sin\theta\cos\varphi+\cos\theta\sin\varphi). \quad (7b)$$

These can be compared with the converted, unmarked components:

$$L = Z\cos(\theta), R = Z\sin(\theta) \qquad (7c)$$

Note:

$$L^M = L\cos\varphi R\sin\varphi, R^M = R\cos\varphi + L\sin\varphi \qquad (8)$$

The marking introduces some controlled cross-talk between the two channels, which is inevitable in the acoustic domain because each human ear is exposed to a superposition of acoustic signals from both speakers. The marking may or may not be perceptible to a listener, depending on the placement of the speakers/headphones, ambient acoustics, position of head/ears, conducted sound, background noise etc. If the marking is perceptible, it may not be objectionable. Some cross-talk is also inevitable in the electronic domain, because most integrated circuit amplifiers are dual (stereo) or quad and have typically 90-100 dB channel separation, although this is frequency and device dependent.

It is known that the brain uses non-linear addition of signals reaching both ears. Virtual pitch composed of the dichotically presented complex tone is not determined separately for the input to each ear, but is the result of binaural fusion (*Pantev C., Elbert T., Ross B., Eulitz C., Terhardt E. 1996. Binaural fusion and the representation of virtual pitch in the human auditory cortex, Hearing Research* 100, 164-170). Therefore, embodiments of the method of marking the audio signal include scaling the re-ordered set of principal components prior to altering with the marking angle $\varphi^M$. For example, a binary (+1, −1) sequence, normally implemented by (+90°, −90°) modulation angles should be scaled by 1/90, or a smaller number, before embedding the digital fingerprint and before performing the inverse operation during recovery of the digital fingerprint, as discussed hereinafter. This renders the changes imperceptible to a listener, according to the data in *Hafter E. R., Dye Jr. R. H., Wenzel E. 1983. Detection of interaural differences of intensity in trains of high frequency clicks as a function of interclick interval and number, J. Acoustical Soc. of America* 73, 1708-1713), as explained hereinafter.

An approximation to the marked values is:

$$L^M = L - R\varphi, R^M = R + L\varphi \qquad (9)$$

The method of marking the audio signal includes combining the converted, marked principal components with the converted un-marked, non-principal components of the audio signal and applying an inverse of the transform function to the combined principal and non-principal components to generate a digital audio signal marked with a digital fingerprint. In applying the inverse transform, the marked signals are transformed back into a bit-stream (time domain). The marking resides in the transform domain, for which there are a large number of choices, and an attacker needs to transform into the same transform domain to be effective, without corrupting the data audibly. An objectionable distortion of the data limits its value.

Figure 2:
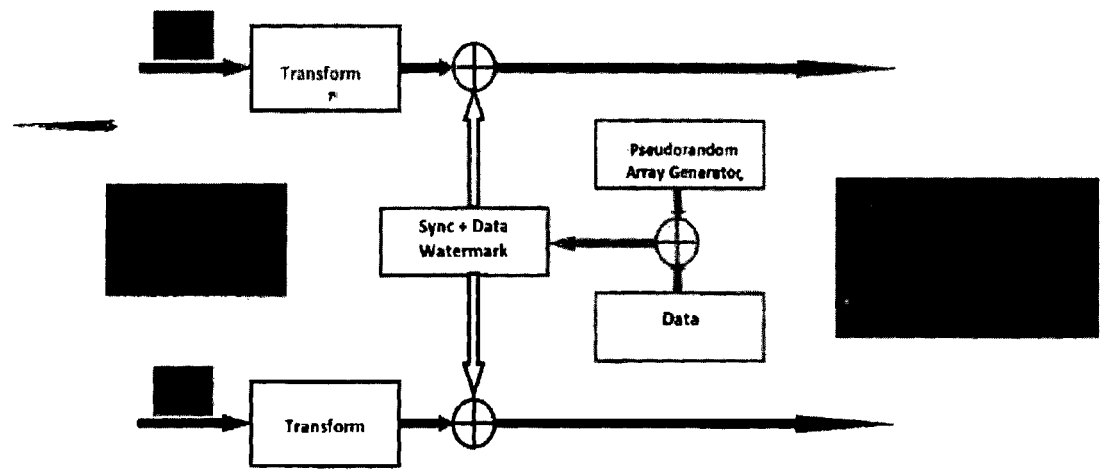
FIG. 2 is schematic diagram illustrating methods of generating a reference signal in accordance with embodiments of the present invention.

With reference to FIG. 2, embodiments of the method include applying a synchronisation watermark in the audio signal using a noise array that is pseudo-random in the time domain or in the time and frequency domain. The synchronization mark provides a time reference for the frequency domain processing, which requires the signal to be partitioned into time apertures (windows). A synchronization watermark in the time and frequency domain guards against cropping, sync attack and pitch shifting. In embodiments where the synchronization mark is in time domain only, the synchronization watermark can be, for example, an m-sequence, Gold code, Kasami sequence or Ipatov sequence.

The synchronisation watermark can conceal data relating to the originator of the audio signal, which can be used, for example, to establish proof of ownership by the originator of the audio clip from which the samples are taken. The secret data can be concealed in a pattern of polarity reversals of the pseudo-random noise array.

All recipients are issued with the same synchronization watermarks comprising the same secret data so that collusion attacks are ineffective against them. Since the synchronization watermarks are common, they are embedded on an unmarked audio clip to serve as a reference signal in the fingerprint recovery process. The fingerprinted copies are distributed to recipients of the audio, whilst the reference and the raw audio are kept by the distributor.

Once synchronization is achieved, the synchronization watermark can be removed before performing the fingerprint analysis, thus reducing any incidental cross-correlation of the watermark with the synchronization watermarks, although this is not essential.

Figure 3:
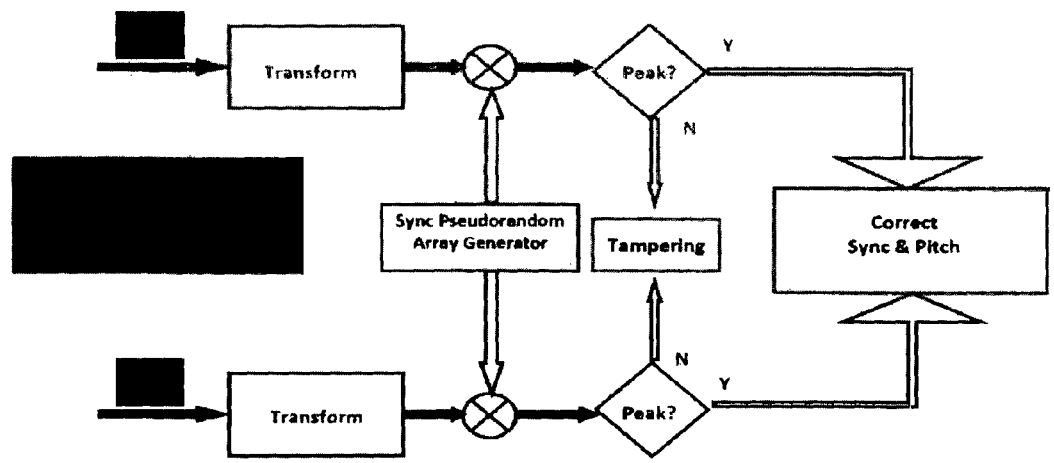
FIG. 3 is schematic diagram illustrating methods of recovering synchronisation signal in accordance with embodiments of the present invention.
Figure 4:
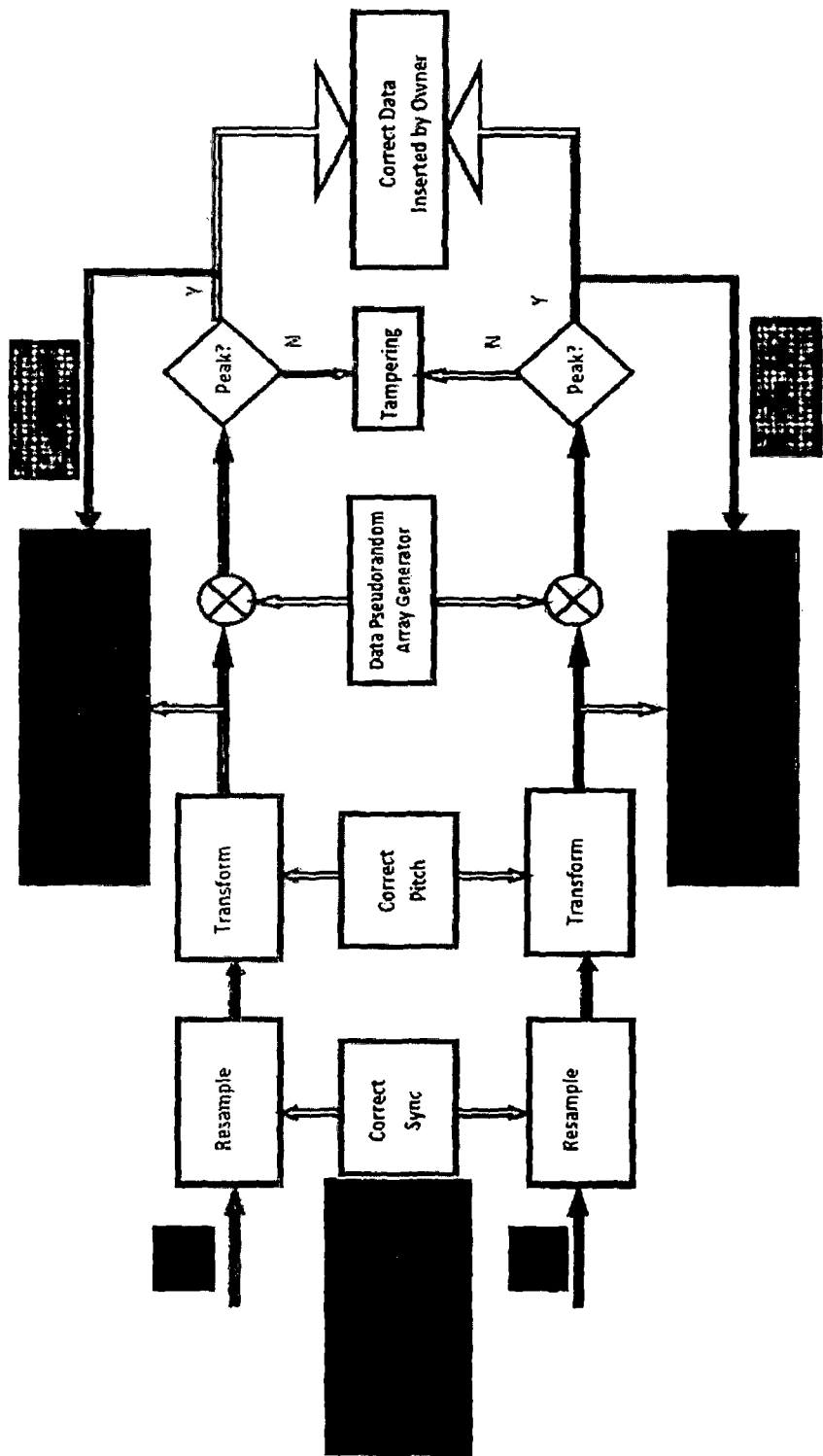
FIG. 4 is schematic diagram illustrating methods of recovering data from a watermarked signal in accordance with embodiments of the present invention.

With reference to FIGS. 3 and 4, another aspect of the present invention includes a method of verifying a distributor and/or one or more recipients of an audio signal that comprises the digital fingerprint and synchronisation watermark. Such methods include recovering the synchronization mark and decoding the secret data. Embodiments of the method include transforming the marked audio signal using the same transform function used for marking the audio signal. The method includes determining a peak in a cross-correlation of a template with the embedded pseudo-random noise array used in applying the synchronisation watermark. The template can be an m-sequence, Gold code, Kasami sequence or Ipatov sequence as appropriate. The absence of a suitable peak indicates likely tampering.

The method includes correcting frequency and synchronisation errors in the marked audio signal on the basis of a location of the peak in the cross-correlation, i.e. the audio is re-sampled and corrected for pitch errors before an attempt to decode the data is performed. The method then includes decoding the secret data from a pattern based on the pseudo-random noise array, such as a pattern of polarity reversals of the array. This pattern may be augmented by a checksum, or a more sophisticated error detection or correction code. Correct data yielded from the decoding step verifies the distributor and/or one or more recipients of the audio signal. If the correct data is decoded, the corrected, transformed audio is suitable for fingerprint recovery, which will now be described.

Figure 5:
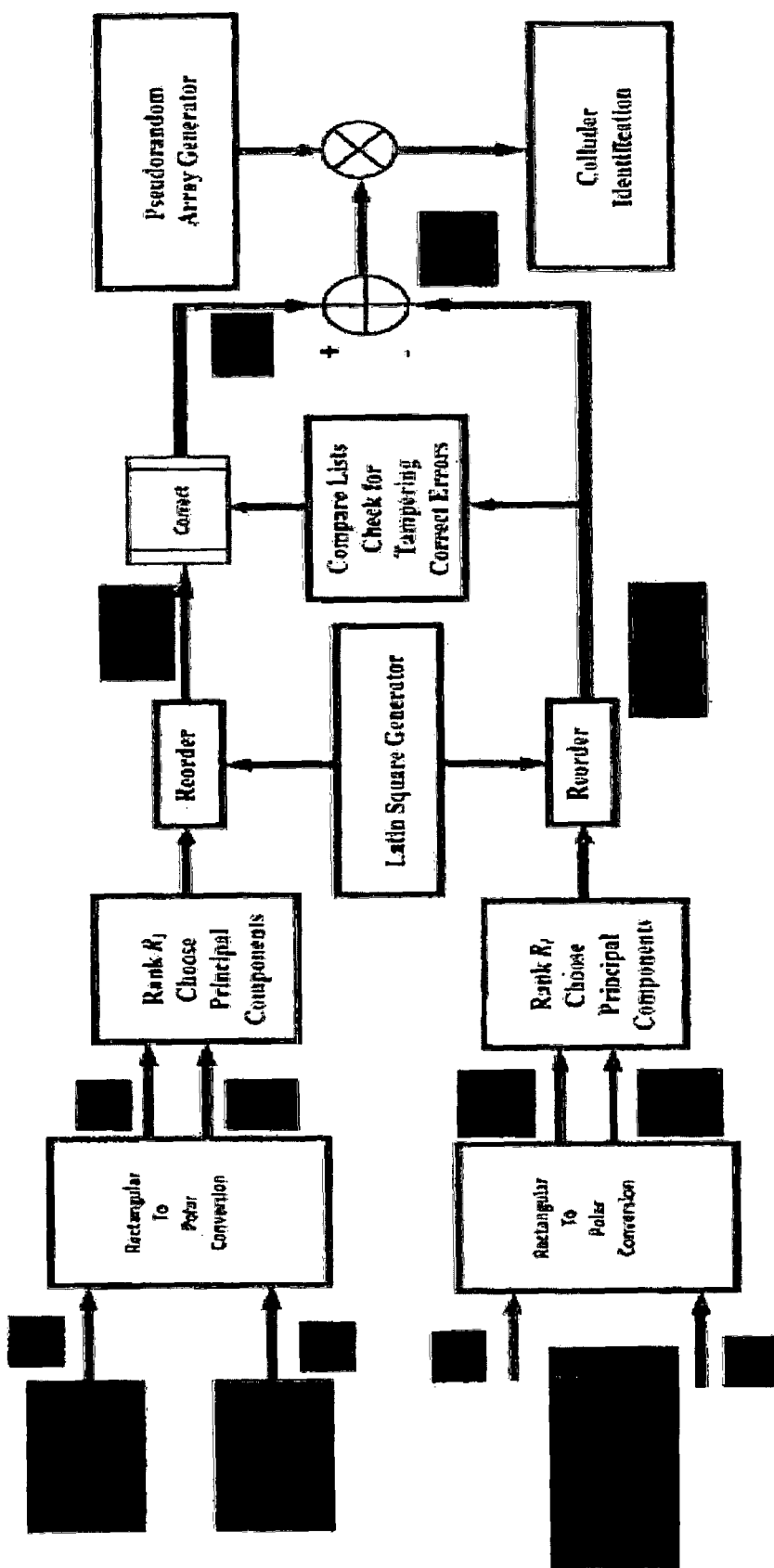
FIG. 5 is schematic diagram illustrating methods of recovering a fingerprint from an audio signal in accordance with embodiments of the present invention.

With reference to FIG. 5, another aspect of the present invention includes a method of recovering a mark from a marked audio signal. The method includes correcting frequency and synchronisation errors in samples of the marked audio signal and transforming the corrected samples of the audio signal using the same transform function used for marking the audio signal.

The method of recovering the mark includes converting the corrected, transformed samples of the audio signal and samples of a reference audio signal to polar coordinates and ranking the converted samples and converted reference samples according to their magnitude. The method includes selecting the n largest principal components of the ranked samples and the ranked reference samples. The marking process is conservative in that it preserves the magnitude of each principal component and the frequency order and hence the ranking of these is unaffected by the marking process.

The method includes permuting a set of the n largest principal components of the samples and the reference samples according to the permutation generator, such as a Latin Square generator. Any minor discrepancies in the reordered ranking are corrected.

The method further includes performing a cross-correlation of the permuted samples with reference arrays identifying the intended recipients of the digital signal. The digital fingerprints are identified from correlations above a predetermined threshold.

The method includes subtracting polar angles in the digital fingerprints from polar angles in the signal samples to remove the digital fingerprint from the audio signal. The remaining mark is possibly scaled and/or distorted by collusion and/or other attacks and possibly fingerprints of other colluders, similarly distorted by the attack. All these fingerprints are different cyclic shifts of a pseudo-random noise array and are therefore recoverable by a complete cross-correlation of the pattern under test with the reference array. The location of significant peaks in this cross-correlation indicates likely participants in a collusion attack.

The nature of the marking is multiplicative. The RMS value of an audio signal during the marking period is of the order of 1/32nd of full scale. This allows for volume adjustments, sound peaks and troughs, otherwise described as dynamic range headroom. Assuming uniform distribution of 20 principal components, each component has an RMS magnitude of:

$$\overline{L(f_c)} \approx \frac{1}{32} \times \frac{1}{\sqrt{20}}. \tag{10}$$

This means that for a 24 bit signal the RMS value of a principal component is of the order of 100,000 units. Therefore, the marking introduces modifications of the order of 1000 units (10 LSBs). This is a worst case scenario since the largest principal component values of right and left channels are likely to be significantly greater. In any event, the modification to the audio is not in just the LSB, but to the 10 lowest bits. Therefore, a coalition would need about 2000 members in order to average such marks to below LSB status (after quantization). Current fingerprinting schemes are not designed to accommodate such large distribution, so the methods proposed here are collusion resistant to a vastly larger number of colluders and should cater for a coalition of the order of 50. By comparison, the brute force technique would need to construct a fingerprint set with 250 marks in order to achieve the same objective.

Digital files may contain one, two or many more channels of audio, e.g. surround sound, or may be bundled together with video to form multi-media. In some circumstances, the audio signal can be monophonic, but it is still possible to perform the marking and detection of the present invention. As an example, consider a slightly different definition of the vector S:

$$S(f) = \sqrt{\|DCT(f)\|^2 + \|DST(f)\|^2}, \tag{11}$$

$$\theta = \frac{\tan^{-1}\square(\|DCT(f)\|)}{\|DST(f)\|}$$

where $\|DCT(f)\|$ and $\|DST(f)\|$ are the magnitudes of the Discrete Cosine Transform (DCT) coefficients and the Discrete Sine Transform (DST) coefficients calculated at frequency f. Other methods of constructing the vector S are also possible. For example, sampling the monophonic data stream to partition it into suitable pairs of numbers can produce a set of vectors in an abstract space.

Regarding multi-channel signals, the IHD audio format, for example, supports seven audio channels corresponding to anything between regular stereophonic reproduction and full home theatre surround sound. The presence of multiple channels offers more opportunities of natural constructions involving higher dimensional vector spaces, which are discussed hereinafter. Multi-channel sound reproduction is used to simulate a real acoustic environment, where binaural signal processing in the human cortex is used to localize the source(s) of sound. It is noted that sometimes the other five channels can be "phantoms", i.e. synthesized from the two principal stereo channels by a combination of filtering, delay and phasing, and may therefore not be truly independent.

Regarding marking strength and perceptibility of the mark, measured data from Hafter et al. can be used to determine the sensitivity of the Human Auditory System (HAS) to variations in the balance angle:

$$\phi = \tan^{-1}\left(\frac{L}{R}\right) \tag{12}$$

A threshold of perceptibility is obtained and any scaling factor used is adjusted to ensure that the marking angle $\varphi^M$ is below that threshold. Hafter et al. explore human sensitivity to differences in intensity of signals applied differentially to the two ears (dichotic). These differences were applied as sequences of clicks at 40 dB SPL each. Inter-click intervals (ICI) and the number of clicks in a sequence were varied. The subjects were trained to recognize the clicks by a calibration sequence of diotic clicks with equal intensity to both ears).

Figure 6:
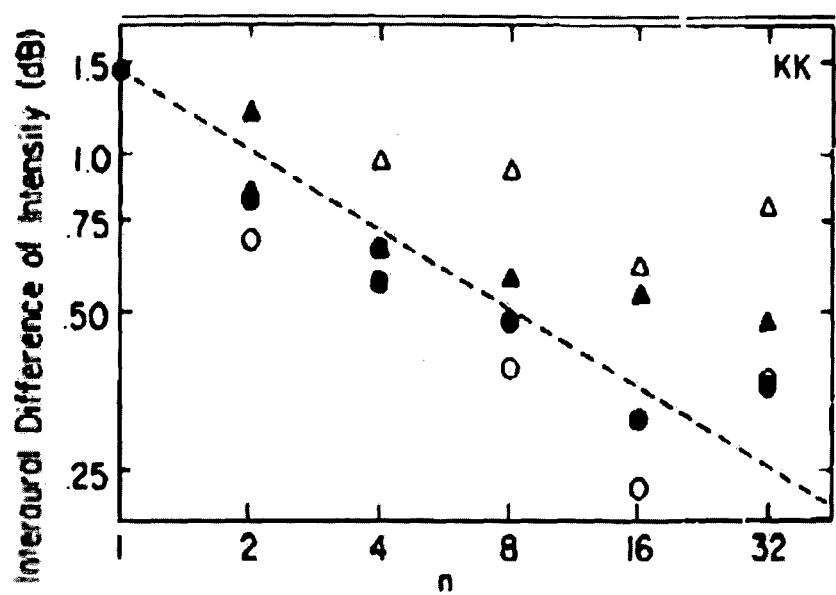
FIG. 6 is a graph illustrating human sensitivity to differences in signal intensity known from Hatter et al.

FIG. 6. from Hafter et al. shows the results for one of five subjects (the one with the best acuity). FIG. 6 shows the thresholds for interaural differences of intensity ($\Delta$ IDI) as a function of the number (n) of clicks in a train. Both are plotted logarithmically. Thresholds were measured in units of decibels. The parameter is the Interclick Interval (ICI). Its values are: (•)=10 ms; (○)=5 ms; (▲)=2 ms; (Δ)=1 ms. The dashed line depicts the slope of −0.5.

The results from Hafter at al. indicate that fluctuations of the order of 0.25 dB should be imperceptible under most conditions. This takes into account that the marking does not affect the whole signal power, but just the principal components, the fact that the number of clicks is likely to be larger, and that the ICI is likely to be longer than 10 ms. Fluctuations of 0.25 dB translate to a ±1.45% variation and therefore $|\varphi_M|<1°$ It should, be noted that the tests in Hafter et al. were performed using headphones in a controlled acoustic environment optimized for detection of such effects.

According to *Liu K. J. R., Trappe W., Wang Z. J., Wu M, and Zhao H.* 2005. *Multimedia Fingerprinting Forensics for Traitor Tracing. EURASIP Book Series on Signal Processing and Communications, Volume 4. ISBN 977-5945-18-6,* "Linear collusion by averaging is a simple and effective way for a coalition of users to attenuate embedded fingerprints. Averaging, however, is not the only form of collusion attacks available to a coalition of adversaries. In fact, for each component of the multimedia signal, the colluders can output any value between the minimum and maximum corresponding values, and have high confidence that the spurious value they get will be within the range of the just-noticeable-different since each fingerprinted copy is expected to have high perceptual quality. An important class of nonlinear collusion attacks is based upon such operations as taking the maximum, minimum, and median of corresponding components of the colluders' fingerprinted copies."

Figure 7:
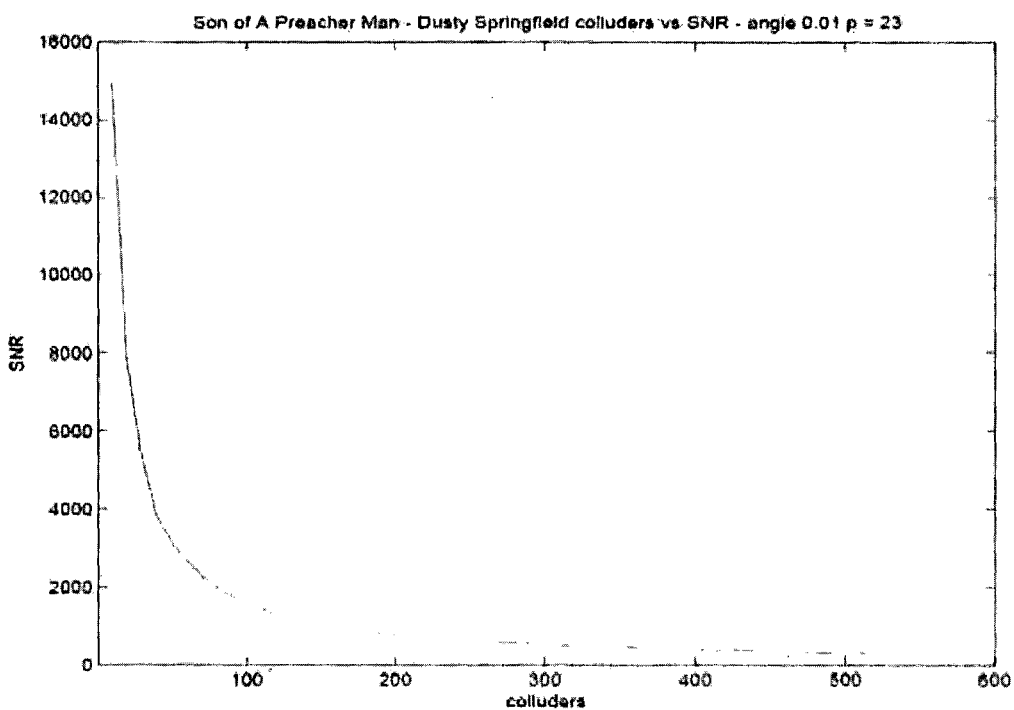
FIG. 7 is a graph of SNR verses number of colluders for an averaging attack illustrating the performance of embodiments of the present invention.

To assess performance, embodiments of the present invention were implemented in Matlab® and tested against the following collusion attacks: averaging, median, Min-Max, ModNeg, Min, Max, and RandNeg attacks. By using sufficiently large arrays; embedding marks in a suitable transform domain, where the data components are significant and easy to hide, and hiding that domain, we can detect and identify hundreds of colluders using a linear attack. An example of our scheme applied to audio fingerprinting is shown in FIG. 7. The graph shows the results of a linear collusion attack on the Signal to Noise Ratio (SNR). More than 500 colluders can be detected in less than 5 seconds of a popular song. A SNR of 3 is sufficient for a detection probability exceeding 90%. The SNR is well above 10 for 500 colluders. Audio files fingerprinted according to the present invention were tested by independent audio experts and compared with the original files. The fingerprints were deemed to be imperceptible.

Figure 8:
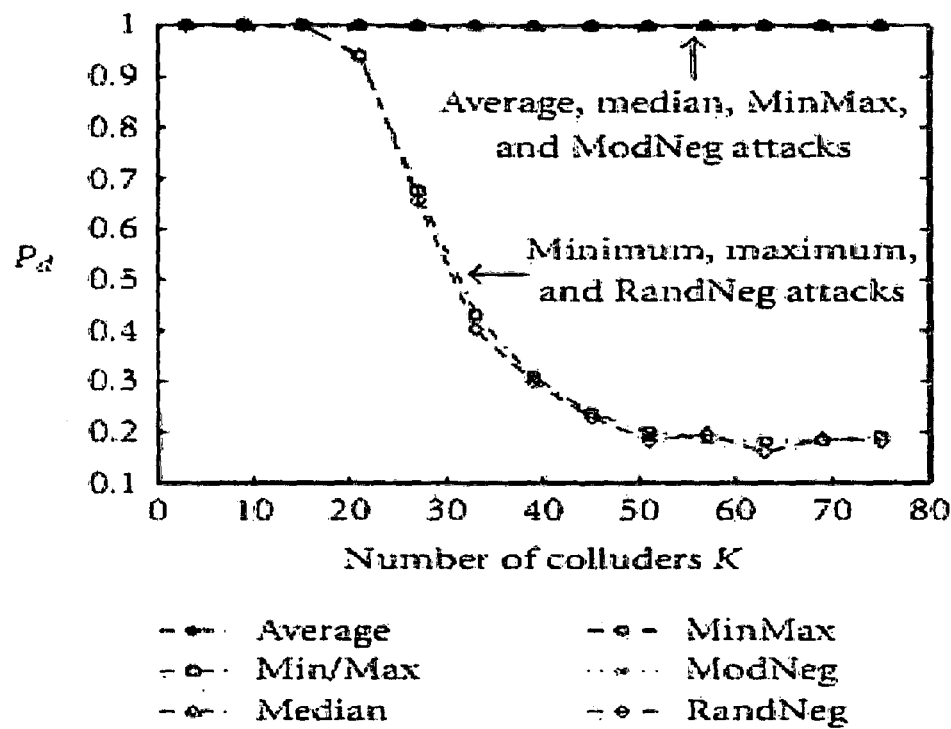
FIG. 8 is a graph illustrating probability of colluder detection known from Trappe et al.

Trappe W., Wu M., Wang Z., and Liu K. J. R. 2003. *Anti-collusion fingerprinting for multimedia. IEEE Trans. on Signal Processing*, 51(4)), shows the effects of various non-linear attacks on the probability of detection of a single colluder from a coalition of colluders. To maintain a 90% detection probability for Min, Max or RandNeg attacks, the number of colluders must be below 24, as seen from FIG. 8. from Trappe at al.

Figure 9:
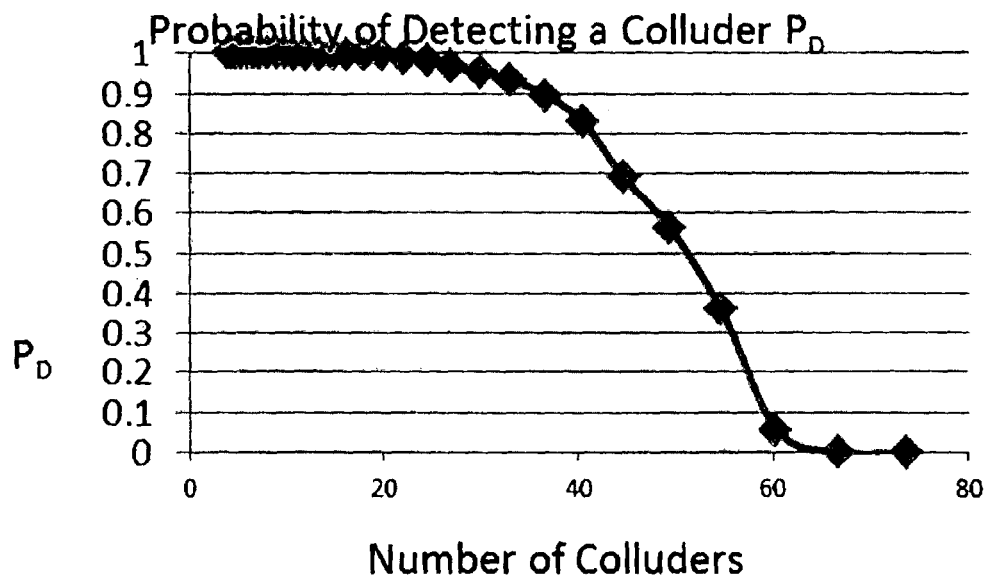
FIG. 9 is a graph illustrating probability of colluder detection illustrating the performance of embodiments of the present invention.

FIG. 9 shows the probability of detection of a single colluder from colluders applying the RandNeg attack to fingerprints applied in accordance with embodiments of the present invention. Here, at most, 37 colluders can be accommodated for a detection probability exceeding 90% (i.e. 13 more than in Trappe et al). This is difficult to achieve, since these probabilities follow an exponential behavior. ($e^{13} \approx 442,413$).

Arrays of large size are preferable for marking audio signals with a digital fingerprint so that the matched autocorrelation of the array is larger than the cross-correlation with the audio. The principal components are restricted in number, so a long, non-square (oblong) array is preferable. In order to make the error probabilities in the extraction process as low as possible for a given embedding strength, the off-peak autocorrelation of the array should be as low as possible. Also, for the same reason, the array should be as dense as possible. In order to carry more information, and/or to cater for more recipients, a large family of arrays with the above properties, and with constrained cross-correlation is needed.

In order to evaluate the performance of the fingerprinting scheme of the present invention, a custom two dimensional almost perfect autocorrelation array was designed. This array is based on a Frank sequence of length $p^2$ over p roots of unity (*Frank R. L. and Zadoff S. A.* 1962. *Phase Shift Pulse Codes with Good Periodic Correlation Properties, IRE Transactions on Information Theory,* vol. 8, no. 6, 381-382.) applied as a shift sequence (*Tirkel A. Z. and Hall T. E.* 2006. *New Matrices with good Auto and Cross-Correlation. IEICE Trans. on Fundamentals of Electronics, Communications and Computer Sciences, A, No.* 9, p. 2315-2321). The rotations around the unit circle in the complex plane were replaced by cyclic shifts of a binary, or almost binary Legendre sequence of length p. Such an array has an autocorrelation of 0 for all shifts with a non-zero horizontal cyclic shift component. Each array used was assigned one of these p(p−1) shifts. For example, p=23 yields an array which was applied to 529 discrete Fourier transform (DFT) time apertures with 23 principal components in each. For cryptographic robustness, the marking was not applied directly, but using a scrambling method based on the discrete logarithm. Primes and prime powers have primitive roots, so this was appropriate for this array geometry. The choice of primitive root and exact details of the permutation mapping can optionally be used as private keys.

In fingerprinting multi-channel audio, video, or multimedia, multi-dimensional arrays with good correlation are required. These arrays should be long in the "time" dimension compared to the other dimensions. The inventors' co-pending International patent application having publication number WO 2011/050390 shows a new method of constructing n dimensional arrays of size (p×p . . . ×p)× ($p^{n-1}$−1). The constructions are based on substituting the columns of new multi-dimensional Welch-Costas arrays obtained by logarithmic or exponential maps. Examples of both, are described hereinafter and the methods of construction are described in WO 2011/050390, which is incorporated herein by reference.

With reference to FIG. 10, the elements of an extension field, in this case GF($3^2$), are mapped onto a square grid. Each element, except 0 can be expressed as a power of a primitive element $\alpha$, or as a pseudo-polynomial of degree one. The two coefficients of that polynomial define a grid position. This is shown in FIG. 10A. The exponent of $\alpha$ can be used to shift a dot in a column of length 8 cyclically, as shown in FIG. 10B. The columns can be substituted by corresponding cyclic shifts of a Sidelnikov sequence to form the array in FIG. 10C, which is much denser than the array in FIG. 10B because it comprises more locations with non-zero values.

The array in FIG. 10B has the Welch property. For any non-trivial 3D cyclic shift of such an array, the number of dots whose position matches that in the original array is 0 or 1. This means that the dense array in FIG. 10C has low off-peak autocorrelation and hence is suitable for watermarking. WO 2011/050390 also teaches how to obtain a family of arrays with good auto and cross-correlation by applying a polynomial map as an intermediate step. The number of matching dots in a corresponding generalised Costas-like array is at most the degree of the polynomial.

Figure 11:
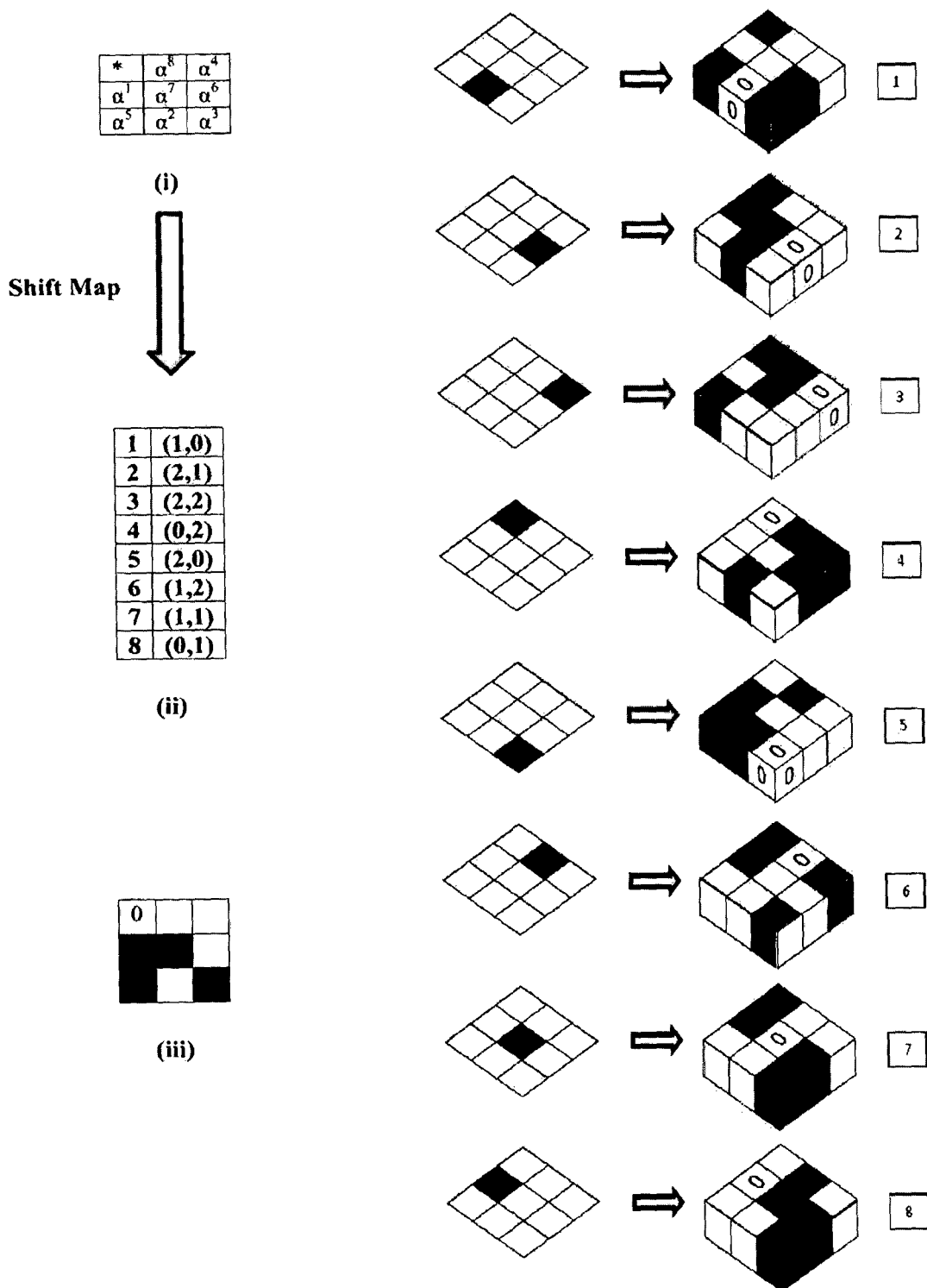
FIG. 11 illustrates an exponential array used in embodiments of the present invention.

The logarithmic method described above has an inverse—an exponential map applied to a 2D dot pattern as shown in the centre of FIG. 11. The 3D dot pattern construction has the Costas property: i.e. for non-trivial 3D cyclic shifts, the number of matching dots is at most 1. Such an array is too sparse for fingerprinting, so we substitute it by a suitable 3×3 array. In our case, the 2D Legendre array is ideal for this substitution. Just as for the logarithmic case, WO 2011/050390 also teaches how to obtain a family of arrays with good auto and cross-correlation by applying a polynomial map as an intermediate step.

The logarithmic and exponential arrays described above intrinsically have a dimension of three or greater and an aspect ratio of:

$$\frac{p^{n-1}-1}{p} \approx p^{n-2} \tag{13}$$

However, their dimensionality can be reduced by one and the aspect ratio increased to $p^{n-1}-1$ by the application of the Chinese Remainder Theorem (CRT). As an example, consider the 3×3×8 3D array shown in FIG. 11. It can be unfolded row by row according to the row ordering shown in FIG. 12A to form the 3×24 2D array shown in FIG. 12B with the same correlation properties as its parent in 3D According to CRT, a 3×1 row labelled 1 is concatenated with a subsequent row labelled 2 and so on. The co-ordinates of row i on the chosen 3×8 face of the 3×3×8 array are (i mod 3, i mod 8) where the first entry is the horizontal location, while the second is the vertical location. Another interpretation is that it is a single diagonal pass through a 3×8 array.

This is not the only method of unfolding. (ai mod 3, bi mod 8) also produces a single pass diagonal as long as gcd(a,3)=1 and gcd(b,8)=1. Therefore, in this case, there are 8 different methods of unfolding. In general, for a p×p× $[(p)]^{n-1}-1)$ array, there are $(p-1)[(\times[\varphi(p)]^{\dagger}(n-1)-1)]$ single pass diagonals, where $\varphi$ is the Euler Totient Function.

Note that the array can also be unfolded in an orthogonal direction to the one just demonstrated. This other array is, in general inequivalent to any cyclic shift of the original array. Therefore, there are $(p-1)[(\times 2\times[\varphi(p)]^{\dagger}(n-1)-1)]$ 2D foldings of a 3D array.

WO 2011/050390 teaches how to extend the construction of a solitary array to a family of arrays. The method of unfolding described here can similarly be applied to such a family.

The unfolding concept can be generalised to higher dimensions. Since the gcd $(p, p^{n-1}-1)=1$ (the dimensions p and $p^{n-1}-1$) are relatively prime, the n+1 dimensional arrays above of the type:

$$(p \times p \times \overset{n\ times}{\cdots\cdots\cdots\cdots} \times p) \times (p^{n-1} - 1) \qquad (14)$$

can be unfolded using the Chinese Remainder Theorem into arrays of the type:

$$(p \times p \times \overset{n-1\ times}{\cdots\cdots\cdots\cdots} \times p) \times [p(p^{n-1} - 1)]. \qquad (15)$$

The unfolded arrays have one less dimension than the original construction and have an aspect ratio of $p^{n-1}-1$. It is envisaged that these higher dimensional unfolded arrays have applications to video, which requires 3D arrays (2D image+time).

It is also envisaged that even higher dimensional arrays will be useful when multi-media is concerned. Video+mono audio requires four dimensional arrays, video+stereo audio requires five dimensions, while video+multichannel audio may require up to thirteen dimensions. The time axis in all these applications is always much richer in samples, so the aspect ratio of the constructions presented here is commensurate with that. In some embodiments, a different marking angle can be used for each dimension.

Examples of applications of the present invention include, but are not limited to digital material to be used as evidence, limited distribution of digital material released to "trusted" parties, voicemail records in cellular phones, fixed or portable computers or recording devices and proof of ownership/authenticity of digital material.

In this specification, the terms "comprise", "comprises", "comprising" or similar terms are intended to mean a non-exclusive inclusion, such that a system, method or apparatus that comprises a list of elements does not include those elements solely, but may well include other elements not listed.

Throughout the specification the aim has been to describe the preferred embodiments of, the invention without limiting the invention to any one embodiment or specific collection of features. It is to be appreciated by those of skill in the art that various modifications and changes can be made in the particular embodiments exemplified without departing from the scope of the present invention.

The invention claimed is:

1. A method of marking a digital signal with a digital fingerprint, the digital signal comprising at least one of an audio or video signal, wherein the digital fingerprint is an ordered rotation in an abstract vector space constructed from principal components of the digital signal, the rotation being determined using families of patterns having low off-peak autocorrelation and low cross correlation, the method including:
    transforming a plurality of samples of the digital signal onto a discrete orthonormal basis;
    altering n principal components by a marking angle to generate marked principal components;
    converting the marked principal components and unmarked non-principal components into Cartesian coordinates to generate converted, marked principal components and converted unmarked, non-principal components;
    combining the converted, marked principal components with the converted unmarked, non-principal components of the signal to generate combined principal and non-principal components; and
    applying an inverse of the transform function to the combined principal and non-principal components to generate a fingerprinted digital signal comprising the digital fingerprint.

2. The method of claim 1, wherein the marking angle applied is a function of a respective principal component, a time interval of the digital signal comprising the n principal components and one or more intended recipients of the digital signal.

3. The method of claim 1, wherein the marking angle comprises an arctangent of the ratio of the magnitudes of two of the n principal components of the digital signal.

4. The method of claim 3, wherein the two of the n principal components of the digital signal are stereo components of a digital audio signal.

5. The method of claim 3, wherein the two of the n principal components of the digital signal are obtained by arbitrarily partitioning the digital signal into two data streams.

6. The method of claim 1, further including scaling the n principal components prior to altering with the marking angle, such that changes in the resulting marked digital signal are imperceptible to a listener or viewer.

7. The method of claim 1, further including applying a synchronisation watermark in the digital signal using a noise array that is pseudo-random in the time domain or in the time and frequency domain.

8. The method of claim 7, wherein the synchronisation watermark is configured to conceal additional data in the digital signal.

9. The method of claim 8, wherein the additional data is concealed in a pattern of polarity reversals of the pseudo-random noise array applied for synchronization.

10. The method of claim 1, further comprising ranking the transformed samples according to their magnitude or frequency or other parameter of the transformed samples.

11. The method of claim 1, wherein altering n principal components comprises altering the n largest principal components of the transformed samples.

* * * * *